United States Patent Office 3,419,168
Patented Dec. 31, 1968

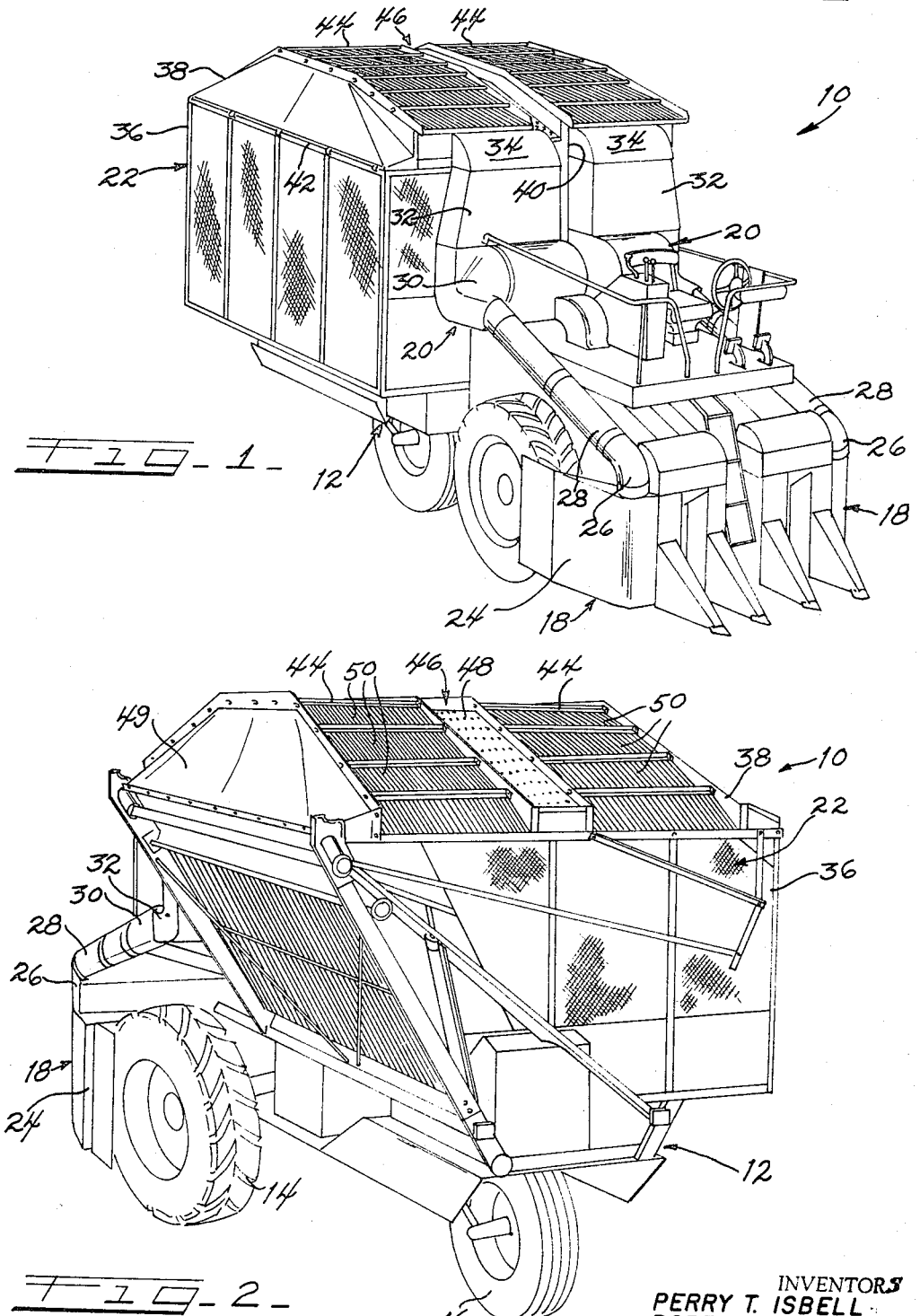

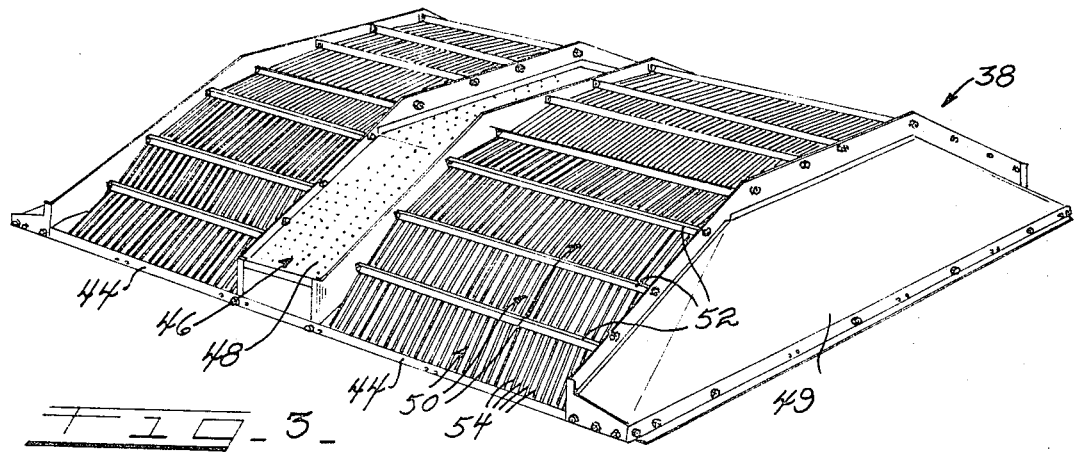
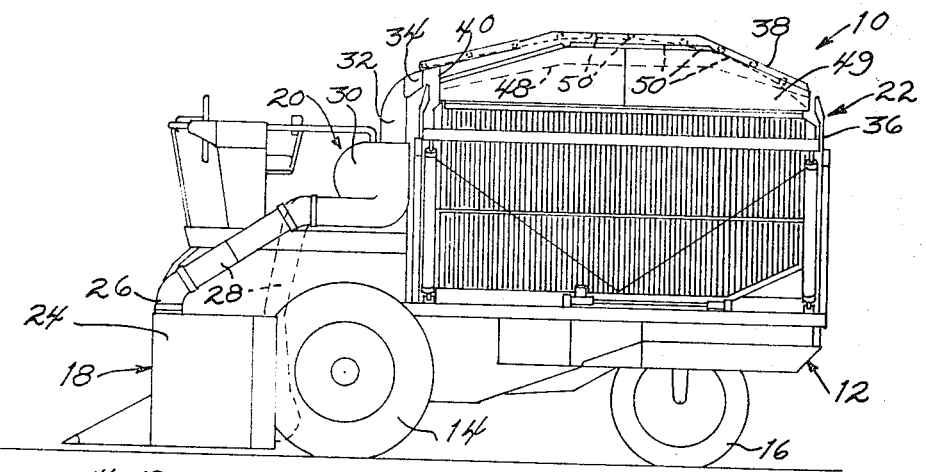
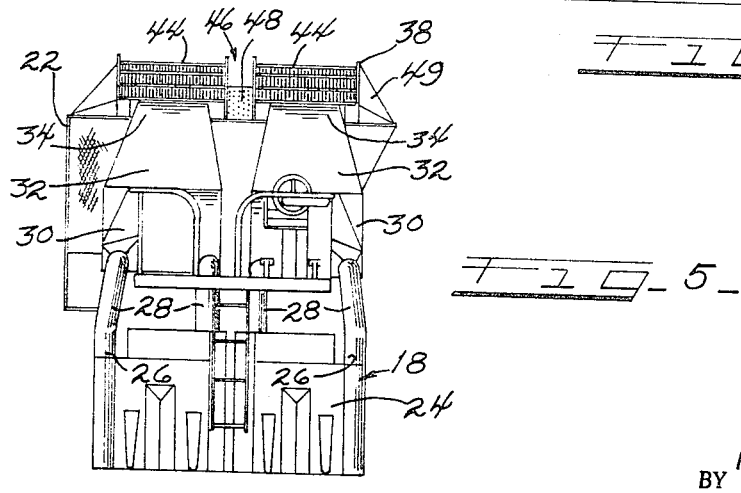

3,419,168
COTTON HARVESTER
Perry T. Isbell and Robert S. Brace, Memphis, Tenn., assignors to International Harvester Company, Chicago, Ill., a corporation of Delaware
Filed Sept. 8, 1966, Ser. No. 578,076
9 Claims. (Cl. 214—83.28)

ABSTRACT OF THE DISCLOSURE

A cotton harvester having a pair of harvesting units, an independent conveyor for each unit, and a basket for receiving cotton from both conveyors and having grate sections aligned with the discharge of respective conveyors and each grate section having individually adjustable portions for controlling the cleaning, the flow, and the deposition of the cotton within the basket.

---

The present invention relates to a cotton harvester.

The invention relates more particularly to a novel construction of trash separating and material distributing means incorporated in storage basket for a cotton harvester.

The invention relates to such construction of storage basket having a grate section in the top thereof for enabling trash particles to escape therethrough, for thereby cleaning the cotton. Such cotton harvesters are generally of a type having a picker unit for each row and a pneumatic arrangement for conveying the harvested cotton from each harvesting unit into the storage basket. These conveying units include conduits or pipes having discharge ends directed into the storage basket. Heretofore the storage basket had a tunnel in the top for receiving the picked cotton from the conveying unit, through which the picked cotton was blown toward the rear of the basket, and in the passage of the cotton through the tunnel, a substantial portion of the trash escaped through the grate which heretofore formed the top of the tunnel.

The construction of the present invention includes a top for a storage basket having two sections, each arranged for receiving the cotton from separate conveying units. Each section includes a grate at the top enabling the escape of trash from the cotton from the corresponding conveying unit. Each section approximates the area of the single tunnel that has heretofore been provided in storage baskets, and as a result, the present construction provides a cleaning area of much greater extent than has heretofore been provided, and in the neighborhood of twice that area.

Another advantage of the present invention is that because of the greater area provided for cleaning the cotton, the grate may be substantially flatter than in harvesters heretofore made because the greater area renders it unnecessary to provide such a sharp angle of impact of the cotton against the grate, and as a result the overall height of the harvester is reduced.

The basket top of the present invention is provided with a walkway between the two grate sections whereby to enable the operator to walk thereon to gain greater access to the grate sections for cleaning them.

Other advantages of the invention will appear from the following detail description taken in conjunction with the accompanying drawings wherein:

FIGURE 1 is a perspective view from the front and at an angle, of a cotton harvester embodying the features of the present invention;

FIGURE 2 is a perspective view of the top of the basket, taken from the rear;

FIGURE 3 is a large scale perspective view of the basket top alone;

FIGURE 4 is a side view of the harvester; and
FIGURE 5 is a front view.

Referring now in detail to the accompanying drawings, the cotton harvester or picker is indiacted in its entirety at 10 and includes a frame 12 supported on main drive wheels 14 and a rear dirigible wheel 16. The picker includes a pair of picker units 18 from which the picked cotton is conveyed by pneumatic conveyor units 20 to a storage basket 22.

The picker units 18, and the conveyor units 20, for the most part may be of conventional construction, the picker units having housings 24 generally defining an interior space into which the picked cotton is disposited, the housing having discharge pipes 26 leading into suction lines 28 which lead to the intake of a fan 30. The fan 30 has an outlet pressure line 32 terminating in a wide terminal outlet end or nozzle 34 directed into the storage basket for delivering the picked cotton thereinto.

The storage basket 22 includes a main mesh bottom section 36, and a top 38 constituting the principal feature of the present invention, but it is to be pointed out that the outlet terminal ends 34 of the conveying unit are of special shape in cooperation with the novel features of the basket top.

The basket top 38 is provided with entrance openings 40 through which the picked cotton is delivered from the outlet ends 34 of the conveying unit. The exact location of the openings 40 in vertical direction may be as desired, but preferably are above the main bottom section 36 of the basket, and formed in the basket top 38, the outlet ends 34 being located to accommodate the swinging movement of the basket top. As will be understood in cotton pickers of this general character, the main section of the basket is tiltable for dumping the cotton, and in tilting that section, the basket top 38 is raised to open position, being hingedly mounted along one side of the main section by hinges 42. This feature of the picker is known.

The basket top 38 is provided with a pair of grate sections 44 extending fore-and-aft the full length of the basket top, beginning at the opening 40, defining the upper marginal edges thereof, and side panels 49, preferably imperforate, closing the top of the basket at the sides of the grate sections. The grate sections are spaced apart, with a walkway 46 therebetween extending the full length of the grate sections and of the basket. The walkway is provided with a tread element 48 which may be of any suitable construction for supporting a person walking thereon. The grate sections 44 are each of substantial width, and substantially of the width of the single tunnel heretofore provided in the basket top. The walkway is preferably lower than the grate sections, although all lying near a common area defining the top of the basket top. The grate sections in themselves are constructed generally in the same manner as the grates in previous pickers, each having a plurality of overlapping grid sections 50, each grid section including a transverse bar or rod 52 and a plurality of transversely spaced longitudinally extending rods or finger 54 providing suitable spaces therebetween for the escape of trash. The rear ends of the grid sections extend below the leading end of the ones rearwardly there of and are adjustable for varying the spaces therebetween.

The tread element 48 may be of any suitable kind such, for example, as perforated metal, providing both friction footage and passages for small particles of trash.

The spacing of the grate sections and the walkway therebetween enables the operator to walk up on the basket top and have greater access to the grate for cleaning it, the operator being thus able to approach close to every point in the area of the grate sections, with the additional advantage of greater safety.

An important advantage is the provision of substantially greater grate area than has been provided heretofore, and in the neighborhood of twice the area. In previous devices a single tunnel was incorporated in the basket top, centrally located and providing the sole grate area. The picked cotton from the two conveying units was delivered into the single tunnel with the result that the cotton formed a single pile in the basket, less effectively distributed and forming a higher pile or stack than would be formed if it were not all delivered through a single tunnel. As a consequence, the greater distribution of the cotton delivered into the basket in the present instance because of the two grate sections of substantial area provides greater effective capacity of the basket for a given height and therefore the basket top may be made flatter and lower for a given capacity and the overall height of the picker be made less.

The greater area of the grate in providing greater capacity for the escape of trash, renders it unnecessary to provide such great air force in blowing the cotton into the basket. Heretofore where greater air blasts were required, the grate assumed greater height and thus greater inclination at the front and rear, in order that the air blast have full effect against the grate for carrying the cotton thereagainst and carrying the trash out through the spaces therein. In the present instance, because of the much greater area of the grate, and the separation of the grate into sections and their direct alignment with the conveying units, the air blasts need not be so great and the grate sections can be much flatter with the same effect in carrying the trash through the spaces therein.

Instead of bringing together the two conveying units 20 into a single discharge element for alignment with the single tunnel as previously, the grate sections 44 in the present instance are aligned with the individual picker units and therefore the pressure lines 32 and their outlets 44 can be positioned straight, as viewed from the front, and not brought over to the middle or otherwise transverserly bent. Consequently lesser air pressure is required and a construction of greater simplicity results. The pressure lines 32 and the nozzles 44 are nearly as wide as the grate sections, resulting in much less back pressure and also resulting in even distribution of the cotton over the grate sections.

The angle of attack of the air stream from the outlets 44 against the grate may be the same as in pickers heretofore, each grid section providing a greater cleaning effect than in previous constructions. Furthermore these grate sections are disposed at opposite sides of the basket. The cotton is thus prevented from mounding as heretofore and obstructing the free flow of aggregate. Thus a cleaner cotton sample is obtained.

While we have disclosed herein a certain preferred form of the invention it will be understood that changes may be made therein within the spirit and scope of the appended claims.

We claim:

1. In a cotton harvester having plural harvesting units, a common basket, and pneumatic units for conveying the harvested cotton from the harvesting units to the basket, the conveying units having nozzles directed into the basket, the construction comprising, a basket top defining transversely spaced openings at the front aligned with said nozzles and positioned for receiving cotton therefrom, said basket top having transversely spaced grate sections of relatively shallow depth including one adjacent each side of the basket in the top one for each nozzle in line with and extending rearwardly from said openings, and each grate section having a plurality of individually adjustable grid portions.

2. In a cotton harvester having harvesting units, a basket, and pneumatic units for conveying the harvested cotton from the harvesting units to the basket, the conveying units having nozzles directed into the basket, the construction comprising, a basket top defining transversely spaced openings at the front aligned with said nozzles and positioned for receiving cotton therefrom, said basket top having transversely spaced grate sections in the top one for each nozzle in line with and extending rearwardly from said openings wherein the basket top has a walkway between the grates and the grates and the walkway all lie closely proximate an area defining the upper limit of the basket cover.

3. The invention set out in claim 2 wherein said area occupies the greater portion of the width of the basket cover, the grate sections extend substantially the full length of the basket, and the basket includes imperforate panels at the sides extending from the side marginal edges of the grates to the side marginal edges of the basket top.

4. The invention set out in claim 3 wherein said side panels are disposed at an angle to the vertical extending downwardly and outwardly.

5. In a cotton harvester having plural harvesting units, a common basket, and pneumatic units for conveying the harvested cotton from the respective harvesting units to the basket, the conveying units having nozzles directed into the basket, said nozzles of the conveying units extending into the basket which is adapted for receiving cotton from the latter, said basket having a top with transversely spaced grate sections in line with and extending rearwardly from respective nozzles, said grate sections disposed one adjacent to each side of the basket and being substantially straight longitudinally as viewed from front and top, and arcuate about transverse axes, the disposition of said nozzles and grate sections being such as to reduce piling of the cotton in mounds obstructing the free flow of the aggregate of cotton and trash against the grate sections, and each grate section having individually adjustable grid portions positionable to intercept and thereby control the flow of crops into the basket and deposition thereof within the basket.

6. The invention set out in claim 5 wherein the conveying units are located at the front and spaced apart transversely, in longitudinal alignment with the grate sections, and the nozzles thereof are directed rearwardly in substantially straight lines as viewed from front.

7. The invention set out in claim 6 wherein the conveying units include fans in a lower position and outlet pressure lines rising therefrom which include said nozzles, and the pressure lines are substantially straight as viewed from front.

8. The invention set out in claim 7 wherein said outlet pressure lines and nozzles are substantially as wide as the grate sections.

9. The invention set out in claim 5 wherein said grid portions are pivotally mounted on transverse axes at their forward ends with their rear ends swingable downwardly from a position in which they substantially overlap the forward ends of the respective grid portions therebehind.

References Cited
UNITED STATES PATENTS

| | | | |
|---|---|---|---|
| 830,102 | 9/1906 | Richmond | 56—12 |
| 2,407,653 | 9/1946 | Dempsey | 209—135 X |
| 3,196,599 | 7/1965 | Meiners et al. | 56—11 |
| 3,215,291 | 11/1965 | Nickla | 214—83.28 X |
| 3,294,371 | 12/1966 | Hubbard | 56—11 X |

HUGO O. SCHULZ, *Primary Examiner.*

U.S. Cl. X.R.

56—12